United States Patent [19]

Johnson

[11] Patent Number: 5,201,799
[45] Date of Patent: Apr. 13, 1993

[54] CLIP ATTACHMENT FOR COMBUSTOR PANEL

[75] Inventor: Donald E. Johnson, Glastonbury, Conn.

[73] Assignee: United Technologies Corporation, Hartford, Conn.

[21] Appl. No.: 702,468

[22] Filed: May 20, 1991

[51] Int. Cl.[5] .................... F02C 7/20; F02G 3/00
[52] U.S. Cl. ..................... 60/39.32; 60/752; 24/563
[58] Field of Search ............. 60/752, 39.32; 24/295, 24/563, 543; 411/522, 523, 524

[56] References Cited

U.S. PATENT DOCUMENTS

| | | | |
|---|---|---|---|
| 1,067,125 | 7/1913 | Maney | 24/563 |
| 2,295,685 | 9/1942 | Place | 411/524 |
| 2,415,540 | 2/1947 | Simmons | 411/524 |
| 2,876,622 | 3/1959 | MacKay | 60/39.32 |
| 4,302,941 | 12/1981 | DuBell | 60/757 |
| 4,512,159 | 4/1985 | Memmen | 60/752 |
| 4,848,089 | 7/1989 | Cramer | 60/752 |
| 4,944,151 | 7/1990 | Hovnanian | 60/752 |

FOREIGN PATENT DOCUMENTS

| | | | |
|---|---|---|---|
| 2131172 | 9/1972 | Fed. Rep. of Germany | 411/523 |
| 2515301 | 11/1975 | Fed. Rep. of Germany | 411/523 |
| 0662879 | 12/1951 | United Kingdom | 411/523 |
| 1001779 | 8/1965 | United Kingdom | 24/295 |
| 1379456 | 1/1975 | United Kingdom | 411/523 |

Primary Examiner—Richard A. Bertsch
Assistant Examiner—Howard R. Richman
Attorney, Agent, or Firm—Edward L. Kochey, Jr.

[57] ABSTRACT

A U-shaped clip secures the posts of floating segments to a surrounding shell. The inboard leg has a slot engaging the post and is compressed against the shell. The outboard leg has a hole engaging the post to resist backward movement of the clip. A resilient finger on the clip abuts the post in the installed position, causing the clip to stay with the post as it moves with respect to the shell.

4 Claims, 1 Drawing Sheet

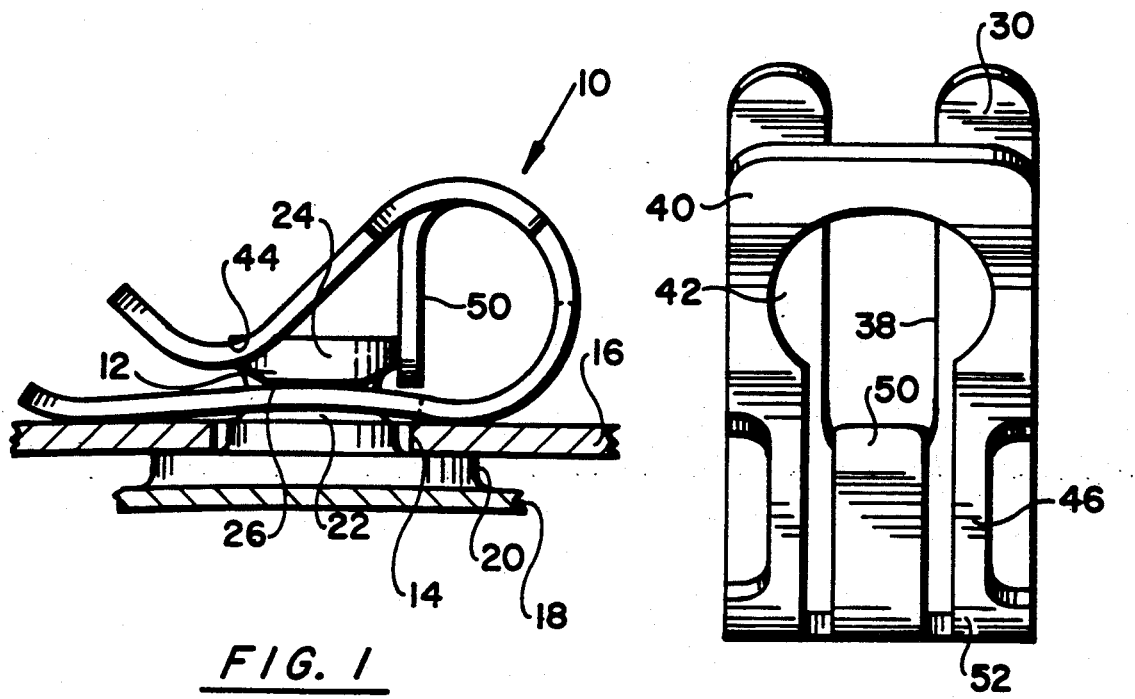
FIG. 1
FIG. 3
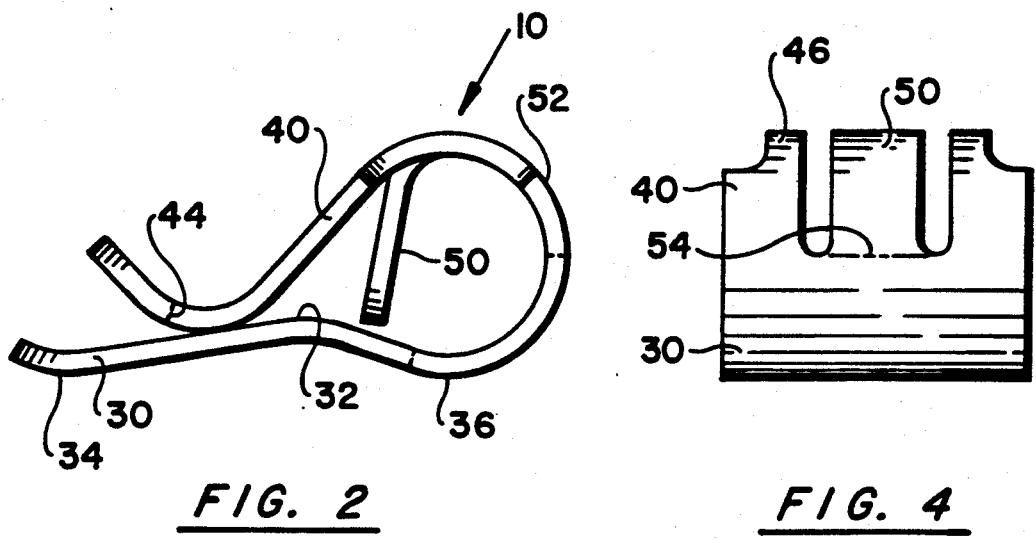
FIG. 2
FIG. 4

CLIP ATTACHMENT FOR COMBUSTOR PANEL

TECHNICAL FIELD

The invention relates to clip attachments and in particular to a clip for securing float wall panels to the outer shell in a combustor for a gas turbine engine power plant.

BACKGROUND OF THE INVENTION

In U.S. Pat. No. 4,302,941 there is described a combustor liner construction for a gas turbine engine. As disclosed there, a cylindrical combustor shell is protected with a plurality of combustor liner segments. Posts on the liner segments pass through the wall of the shell for support in a manner to permit floating of these segments.

U.S. Pat. No. 4,512,159 shows a clip attachment for securing these posts. The post has a reduced thickness portion remote from its outer end and the clip has a slot which engages this reduced thickness portion. The leg of the clip which is secured to the post is bent sinusoidally to apply opposing forces to the shell and to the post, thereby maintaining a flexible loading against the post.

The other leg of the U-shaped clip is bent inwardly toward the post. It has a hole therein which fits over the post with one edge of the hole engaged against the post. This prevents the clip from dislodging backwardly.

Not only do these segments expand relative to the shell requiring some movement in each post support area, but considerable vibration exists in the engine. When insufficient preload exists or is lost during operation, vibration occurs between the post and the clip. This causes rubbing and fretting between the portion of the clip engaging the head of the post and the clip in that area. When this wears through the retainer fails entirely and falls off leaving a completely unsupported post.

SUMMARY OF THE INVENTION

The combustor of a gas turbine engine has an outer shell and a plurality of inner segmented floating members. The segmented members move with respect to the shell both circumferentially and axially in response to thermal expansion differences of the two components.

A plurality of posts are secured to each of the segmented members. Each post extends radially through an opening in the shell. Each post further has a reduced thickness portion for receiving a clip remote from the ends of the post, and a thicker portion toward the end of the post.

A substantially U-shaped clip for each post has an inboard leg adjacent to shell. This leg has a slot therein sized to encompass a reduced thickness portion of the post with the slot being of less width than the full thickness portion of the post. An outboard leg of the clip is bent inwardly toward the inboard portion and has a hole overlaying the slot. The post is received in this hole and engages the edge of the hole toward the open end of the U-clip.

A resilient finger is also located on the clip in such a manner as to abut the post in a secured position. Accordingly, the clip is resiliently locked to the post. Should the preloading of the post be lost and vibration cause fretting, the clip will move with the post so that all wear occurs on the surfaces abutting the shell. Not only is there more surface there to resist the wear, but even in the event of a complete wear through at these locations, the clip and its securing function will not be lost.

BRIEF DESCRIPTION OF THE DRAWINGS

FIG. 1 is a view of the clip in the installed position;
FIG. 2 is a side view of the clip;
FIG. 3 is a top view of the clip; and
FIG. 4 is an end view of the clip.

DESCRIPTION OF THE PREFERRED EMBODIMENT

Referring to the installed clip illustration of FIG. 1, clip 10 is used for the purpose of securing post 12 through opening 14 in shell 16. Segmented members 18 of a combustor liner are secured within the shell 16, each being supported by four (4) posts 12. In order to maintain appropriate spacing between the segmented members and the shell 16 a cylindrical pad 20 is located at each support location. Each post 12 is secured to segmented member 18 through pad 20.

Each post 12 has a reduced thickness portion 22 which may represent parallel slots on two (2) sides of the post. A full thickness portion 24 of the post is located outboard of this reduced thickness portion with an abutment surface 26 facing toward the shell.

FIGS. 2, 3 and 4 illustrate the clip in the uninstalled position. Clip 10 is of substantially U-shape with an inboard leg 30 located where it will be adjacent shell 16 in the installed position. This leg is of sinusoidal shape so that pressure surface 32 will exert force against post abutment surface 26 in the installed position, maintaining some preload on the post support. Areas 34 and 36 in the installed position are in contact with the shell 16. Slot 38 is located in leg 30 of a width to encompass the reduced thickness portion of post 24, but of a width not so great as the full thickness portion 24 of the post 12. This clip is installed by sliding the leg 30 through the reduced portion of the post. As illustrated here, the slot runs the full length to the end of the U-shaped clip. It may alternately have a larger diameter hole close to the end of the clip to permit dropping of the clip over the post with the slot continuing rearwardly therefrom.

The outboard leg 40 of the U-shaped clip is bent toward the inboard leg. A hole 42 in this leg overlies the post in the installed position with hole edge surface 44 located adjacent to a portion of the post. This outboard leg 40 must be bent toward the inboard leg 30 at least to a sufficient extent to provide this interference between surface 44 and the post. Reduced thickness portion 46 of leg 40 is supplied.

The resilient finger 50 is cantilevered from the return bent portion 52 of the U-shaped clip. It is cantilevered at location 54 preferably in the center of the return bend portion so as to provide significant flexibility to the finger 50.

In the installed position shown in FIG. 1, it can be seen that this finger 50 is urged against post 12 and has been deflected away from the position shown in FIG. 2.

In the clips of the prior art wear between areas 32 and the surface 26 of the post caused either the head of the post or a portion of leg 30 of the clip to disappear with the result that the clip was lost. With this invention, however, the clip 10 is retained against the post 12 between surface 44 of the clip and resilient finger 50 of the clip. Accordingly, even if there should be vibration, wear occurs on surfaces 34 and 36 where more material exists to tolerate the wear. Furthermore, even should the clip wear through, engagement with the post remains and complete failure will not occur.

I claim:

1. In combination: a combustor for a gas turbine engine having an outer shell and a plurality of inner segmented floating members, movable circumferentially and axially with respect to said outer shell in response to thermal expansion;
   a plurality of posts secured to each of said segmented members, each post extending radially through an opening in said shell;
   each post having a reduced thickness clip receiving portion remote from the ends of said posts, with a thicker portion outboard of said reduced thickness portion with respect to the segmented member to which said each post is secured;
   a substantially U-shaped clip for each post having an inboard leg adjacent said shell and an outboard leg bent inwardly towards said inboard leg;
   a slot in said inboard leg sized to encompass said reduced thickness portion, but of a width less than said thicker portion;
   said outboard portion having a hole overlaying said post to receive said post, said post extending radially into said hole; and
   a resilient finger on said clip resiliently abutting said post and urging said outboard portion of said clip against said post.

2. A combination as in claim 1 comprising also:
   said inboard leg being sinusoidally shaped to bear against said shell at predetermined points to impart a radial load between said shell and said posts.

3. A combination as in claim 1 comprising also:
   said resilient finger being cantilevered from the U-shaped portion of said U-shaped clip.

4. A combination as in claim 3 comprising also:
   said U-shaped portion including a return bend portion of a substantially 180° arc; and
   said resilient finger cantilevered from the return bend portion of said U-shaped clip.

* * * * *